Oct. 9, 1928.

E. O. ENGELS 1,686,965

SAFETY DEVICE FOR GAS FIRING SYSTEMS

Filed Oct. 3, 1925  6 Sheets-Sheet 1

Fig. 1

INVENTOR
Eugene Oscar Engels
BY Newell & Spencer
ATTORNEYS

Oct. 9, 1928.  1,686,965
E. O. ENGELS
SAFETY DEVICE FOR GAS FIRING SYSTEMS
Filed Oct. 3, 1925  6 Sheets-Sheet 2

INVENTOR
BY Eugene Oscar Engels
Newell & Spencer
ATTORNEYS

Oct. 9, 1928.

E. O. ENGELS 1,686,965

SAFETY DEVICE FOR GAS FIRING SYSTEMS

Filed Oct. 3, 1925 6 Sheets-Sheet 3

Fig. 7

INVENTOR
BY Eugene Oscar Engels
Newell & Spencer
ATTORNEYS

E. O. ENGELS 1,686,965

SAFETY DEVICE FOR GAS FIRING SYSTEMS

Filed Oct. 3, 1925  6 Sheets-Sheet 5

INVENTOR
BY Eugene Oscar Engels
Newell + Spencer
ATTORNEYS

Oct. 9, 1928.

E. O. ENGELS 1,686,965

SAFETY DEVICE FOR GAS FIRING SYSTEMS

Filed Oct. 3, 1925      6 Sheets-Sheet 6

INVENTOR
BY Eugene Oscar Engels
Newell & Spencer
ATTORNEY

Patented Oct. 9, 1928.

1,686,965

UNITED STATES PATENT OFFICE.

EUGENE OSCAR ENGELS, OF SAGINAW, MICHIGAN, ASSIGNOR, BY MESNE ASSIGNMENTS, TO BAKER PERKINS COMPANY, INC., OF SAGINAW, MICHIGAN, A CORPORATION OF NEW YORK.

SAFETY DEVICE FOR GAS-FIRING SYSTEMS.

Application filed October 3, 1925. Serial No. 60,319.

This invention relates to new and useful improvements in automatically operated safety devices, and it pertains more particularly to such devices especially adapted for use in connection with gaseous fuel burners of the type wherein the fuel is supplied to the burners under pressure.

In the operation of heating ovens, furnaces, drying chambers and similar apparatus it is a common practice to employ a plurality of burners of the gaseous fuel type and to which gaseous fuel is furnished under pressure. It sometimes happens that the pressure of the fuel in the supply line feeding the burners falls to a point where one or even more of the burners may become extinguished.

When any of the burners become extinguished, the gaseous fuel passing thereto enters the apparatus heated by the burners and causes the accumulation of free gas therein. A subsequent lighting of the extinguished burner or burners also ignites this free gas which ofttimes causes an explosion within the apparatus resulting in serious damage thereto.

It has been proposed to associate an igniting device with each of the burners which igniting device is preferably of the electric spark type and is intermittently operated by any suitable motor driven timing means in order that a burner which may have become extinguished either accidentally or otherwise will be relighted by the intermittently operating igniting device associated therewith, thus preventing a burner from remaining extinguished for a sufficient period to supply a dangerous quantity of gas to the apparatus being heated by the burner.

One example of this type of burner and electric igniting means is shown in the pending application of E. T. Branzhof, filed December 6, 1922, Serial No. 605,155.

It has been found in actual practice, however, that these electric igniting devices are not wholly reliable, and that through the interruption of the electric current or through the break-down of the igniting mechanism they sometimes fail to operate. In this event the apparatus being heated is flooded with free gas which is ignited either by one of the burners or the igniting device associated therewith thus resulting in an explosion the extent of which is governed only by the amount of free gas which has accumulated in the apparatus at the time the explosion occurs.

One object of the present invention is to obviate the possibility of the accumulation of gas in an apparatus, the heat of which is supplied by gaseous fuel burners when one or more of the burners has become extinguished.

Another object of the invention is to produce a controlling mechanism for controlling the flow of gas to gaseous fuel burners provided with igniting devices in which the supply of gas to the burners will be automatically cut off upon the failure of the igniting devices to function.

A still further object of the invention is to produce a mechanism for use in an apparatus, the heat of which is supplied by gaseous fuel burners and provided with igniting devices for the burners, which will operate either when the pressure of the gas in the supply main falls below a predetermined point or when the igniting devices fail to function, to cut off the supply of gaseous fuel to the burners.

With this and other objects in view the invention consists in certain novel features, constructions and combinations of parts hereinafter described and particularly pointed out in the claims, the advantages of which will be readily understood and appreciated by those skilled in the art.

The invention will be clearly understood from the accompanying drawings illustrating the invention in its preferred forms and the following detailed description of the constructions therein shown.

In the form of the invention illustrated in Figures 1 to 6 inclusive of the drawings, a valve 1 is provided, which valve is introduced into a gas main 5, the inlet to the valve being designated by the reference numeral 2 and the outlet thereof by the reference numeral 4, the main 5 on the outlet side of the valve leading to the burners (not shown). The valve body 7 is provided with an internal web or wall 8' formed with a seat 8, and adapted for engagement with the seat 8, in order to prevent passage of gas through the main 5, there is a valve member 9. This valve member 9 is secured between the ends of a valve stem 10 by means of a cross pin 18. The valve member 9 is normally held in open position in the present construction by a latch or trigger which is connected with a diaphragm arranged to be controlled by the pressure of the gas within the valve.

The upper wall of the valve 1 is provided with an opening and carries an annular housing 11, and supported by this annular housing 11 there is a dome-like member 14. The annular housing 11 and the dome-like member 14 are secured to the valve body 7 by bolts 17, as more clearly shown in Fig. 1.

Figure 1:
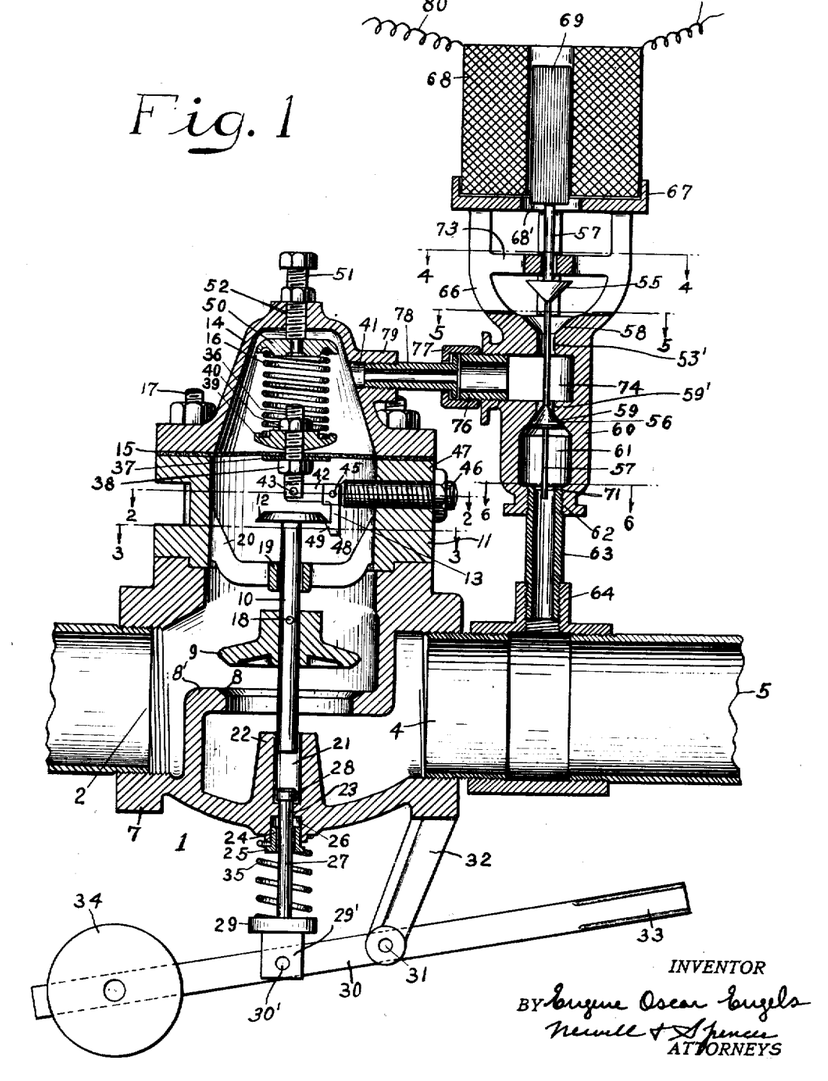
Figure 1 is a vertical sectional view showing a mechanism embodying one form of the invention.
Figure 2:
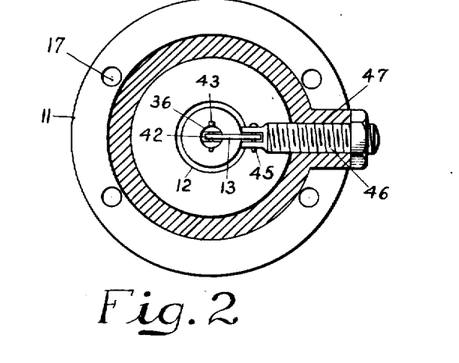
Figure 2 is a horizontal sectional view taken on the line 2—2 of Figure 1.
Figure 3:
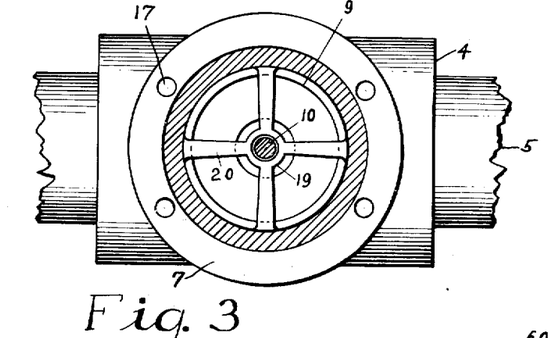
Figure 3 is a horizontal sectional view taken on the line 3—3 of Figure 1.
Figure 4:
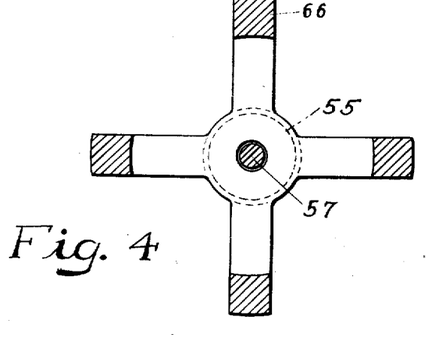
Figure 4 is a horizontal sectional view taken on the line 4—4 of Figure 1.
Figure 5:
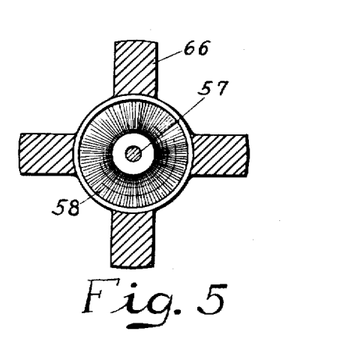
Figure 5 is a horizontal sectional view taken on the line 5—5 of Figure 1.
Figure 6:
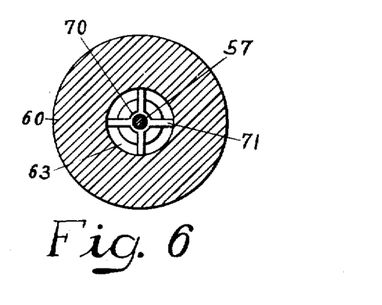
Figure 6 is a horizontal sectional view taken on line 6—6 of Figure 1.

The valve stem 10, heretofore mentioned, has its upper end slidably mounted in the bearing 19 of a spider 20, which spider extends slightly into the valve 1 from the annular chamber 11. Carried by the upper extremity of the valve stem 10 there is a disk 12, the edge of which is beveled, and adapted for engagement with the peripheral edge of this disk 12 for the purpose of maintaining the valve member 9 out of engagement with the seat 8, there is a trigger 13. This trigger 13 comprises a substantially right-angle member having two arms 42 and 48, the arm 48 being formed with a hook 49 which is adapted for engagement with the disk 12 to support the valve member 9 out of engagement with the seat 8, as heretofore stated.

This trigger member 13 is pivotally mounted, as at 45, upon a screw-threaded bolt 46, passing through the side wall of the annular housing 11, the side wall of the housing 11 being reinforced at this point, as designated by the reference numeral 47. Pivotally connected as at 43 to the arm 42 of the trigger member 13 there is a screw-threaded bolt 36. This screw-threaded bolt 36 passes through a diaphragm 15, which diaphragm 15 is secured in position upon the annular housing 11 by the dome member 14 and the bolts 17. A nut 38 is carried by the screw-threaded bolt 36, and resting upon said nut 38 there is a washer 37, which washer engages the under face of the diaphragm 15, as more clearly shown in Fig. 1. Upon the opposite side of the diaphragm 15 and carried by the screw bolt 36, there is a spring saddle 39. The diaphragm 15 is clamped between the washer 37 and the spring saddle 39 by means of a nut 40. Thus by downward movement of the diaphragm the trigger member will be disengaged from the disk 12 to release the valve member 9.

Having one of its ends in engagement with the spring saddle 39, there is a coiled spring 16, the opposite end of which engages a spring saddle 50 carried by a threaded bolt 51 which bolt 51 is adjustably mounted in an interiorly threaded opening 52 in the top wall of the dome member 14. By a turning of the threaded bolt 51 the spring 16 may be placed under the desired tension to regulate the pressure at which the diaphragm 15 will be operated to cause the trigger 13 to disengage the disk 12, and permit the valve member 9 to move into engagement with the seat 8 to close the valve in a manner to be hereinafter more specifically described.

The bottom wall of the valve 1 is formed with a nipple 22 having a recess 21 therein, and in this recess 21 the lower end of the valve stem 10 is adapted for sliding movement. The bottom wall of the recess 21 is provided with a passage 23, in which is mounted a plunger 27 having an enlarged head 28, for engagement with the lower end of the valve stem to elevate the valve to a point where the disk 12 will engage the trigger 13 to support the valve in open position. This plunger 27 passes through a suitable stuffing box provided with packing 26, which packing is maintained under a sufficient pressure to provide a gas-tight joint by means of a gland 25 mounted in the recess 24. This plunger 27 is provided on its lower end with a head 29, and interposed between said head 29 and the bottom wall of the valve 1, there is a coiled spring 35. Projecting from the head 29 of the plunger 27 there is an arm 29', and pivotally connected to the arm 29', as at 30', there is a lever 30. This lever 30 is pivotally mounted, as at 31, on an arm 32, projecting from the valve member 1, and said lever 30 is provided with a handle 33 and an adjustable counterweight 34, which latter acts to maintain the lever 30 normally in the position in which it is shown in Figure 1.

By this construction it will be noted that one side of the diaphragm will at all times be under the influence of the pressure of the fuel gas present at the inlet side of the valve 1. When the gas pressure is normal the diaphragm will be held in elevated position, Fig. 1, to maintain the trigger 12 in position to hold the valve member 9 out of engagement with its seat as shown in said figure. The coiled spring 16 is preferably so adjusted by the threaded bolt 51 that the pressure exerted thereby will balance the normal pressure of the fuel gas present at the inlet side of the valve 1.

In order that the diaphragm 15 may at all times operate freely under the influence of the pressure of the fuel gas or the pressure of the spring 16, the dome member 14 under normal operating conditions has communication with the atmosphere.

The communication of the dome member 14 with the atmosphere is accomplished in the following manner. The dome member 14 is formed with a nipple 79, which in turn has a passage 41 leading therethrough. Threaded into this nipple 79 there is a pipe section 78, which pipe section 78 has communication with a chamber 74 through the medium of a union 77 and a nipple 76. The chamber 74 is formed in a valve body 60, and leading therethrough there is a passage 53' leading to the atmosphere. This passage 53' is formed with a seat 58, and adapted for engagement with the seat 58 there is a valve member 55.

Leading from the lower wall of the chamber 74 there is a passage 59', which passage leads to a chamber 61 formed in the valve body 60. This chamber 61 has communication with the gas main 5 by means of a pipe section 63, threaded as at 62 into the valve body 60 at one end, and connected at its other end to a T-coupling 64 in the main 5. One of the walls of the chamber 61 is formed with a seat 56, and adapted for engagement with the seat 56 there is a valve member 59. These two valves 55 and 59 are mounted in spaced relation upon a valve rod 57 extending through the passages 53' and 59'. This valve rod 57 is guided at its lower part below the valve member 59 by a spider 71 mounted in the pipe section 63 and provided in its center with a bearing 70, in which the valve rod 57 slides, and at its upper part above the valve member 55 by a similarly arranged bearing and spider 73.

When the parts are in the position shown in Fig. 1, it will be noted that the valve member 59 is in engagement with its seat 56, and the valve member 55 is spaced with respect to its seat 58. This position of the parts establishes communication between the dome member 14 and the atmosphere through the passage 41, pipe section 78, nipple 76, chamber 74, and the passageway 53'.

The reference numeral 68 designates a solenoid, and this solenoid is in circuit with an electrically-operated igniting device by means of the lead wires 80 and 81. Carried by that end of the valve rod 57 adjacent the solenoid 68 there is a solenoid core 69, and it is obvious that so long as the solenoid 68 is energized, which condition is maintained by uninterrupted operation of the electric igniting device, the valves 55 and 59 will be maintained in the position in which they are shown in Fig. 1, and the dome member 14 will have free communication with the atmosphere.

In the present embodiment of the invention, the solenoid 68 is supported upon a suitable base 67 which in turn is carried by suitable supporting arms 66 extending from the valve body 60, the base 67 having an opening 68' therein to permit of the free passage of the solenoid core 69.

The several parts are shown in Fig. 1 in their normal operating position, and said parts will be maintained in this position so long as the pressure in the main 5 does not fall below the predetermined point for which the several parts are set, and so long as the electric igniting device continues to operate.

Assuming now that the pressure in the main falls below the predetermined point, or to a point which would cause any of the burners to become extinguished, this fall in pressure reduces the pressure present at the inlet side of the valve 1, and under the influence of the coiled spring 16 the diaphragm will be depressed, which action causes a disengagement of the trigger 13 from the disk 12, and permits the valve member 9 to move into engagement with the seat 8, thus shutting off the supply of gas to the burners and preventing an accumulation of free gas in the apparatus which is heated thereby.

Assuming again that the pressure remains constant in the main 5, and the electric igniting device fails to operate. In this instance the solenoid 68 would become deenergized and the valve stem 57 would move downwardly, Fig. 1, carrying the valve 55 into engagement with its seat 58 and the valve 59 out of engagement with its seat 56. This cuts off communication between the dome member 14 and the atmosphere, and permits the gas in the main 5 to pass into the dome member 14 by way of the T-coupling 64, pipe connection 63, chambers 61 and 74, nipple 76, pipe 78, and passage 41. This position of the several parts gives equal gas pressure upon opposite sides of the diaphragm 15, and permits the diaphragm to move under the influence of the spring 16 in a direction to cause the trigger 13 to disengage the disk 12 and permit the valve 9 to move into engagement with its seat 8 and cut off the supply of gas to the burners.

Assume that an operation has occurred which cuts off the supply of gas to the burners and it is desired to again start the burners. This is done by grasping the handle 33 of the lever 30, rocking said lever about its pivotal point 31 until the head 28 of the plunger 27 engages the end of the valve stem 10, after which further movement of the plunger 27 will move the valve stem 10 and its valve member 9 to a point where the trigger 13 will ride the beveled edge of the disk 12 and engage therebeneath to maintain the valve 9 in spaced relation to its seat 8, thus permitting a free flow of gas through the main 5 to the burners. During this operation the coiled spring 35 serves as a cushion for the lever 30, and the spring together with counterweight 34 thereafter acts to return the lever 30 to its normal position in which it is shown in Figure 1.

Figure 14:
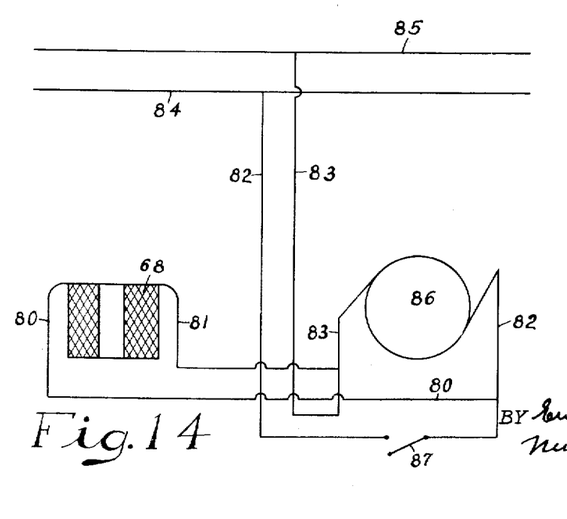
Figure 14 is a view setting forth diagrammatically the manner in which the electrical mechanism of the invention is wired.

Referring to Fig. 14, in which is shown diagrammatically the manner in which the solenoid 68 is electrically connected with the electric igniting device, and in this figure the reference numerals 84 and 85 represent electrical current feed lines. Branching off from these feed lines 84 and 85 are two leads 82 and 83, respectively, which leads are connected to a motor 86 employed to drive the timing mechanism of a suitable electric igniting device to produce an intermittent spark at the burners.

In one of these leads there is is switch 87 by means of which the circuit to the motor 86 may be broken. The solenoid 68 is connected, as heretofore stated, by leads 80 and 81 to the leads 82 and 83, respectively.

In Figs. 7 to 13, inclusive, is shown a modified form of electric control for the valve 1 in the main 5, and this mechanism may be preferable to that heretofore described in certain types of installations, because of the fact that it has a quicker and more gentle action.

In this form of the invention there is a valve body 90 provided with an extension 91, and this valve body 90 is connected to the dome member 14 by the nipple 76, union 77, and the pipe section 78, as in the heretofore described form. The extension 91 is connected with the main 5 by the pipe section 63.

Figures 8, 12, 13:
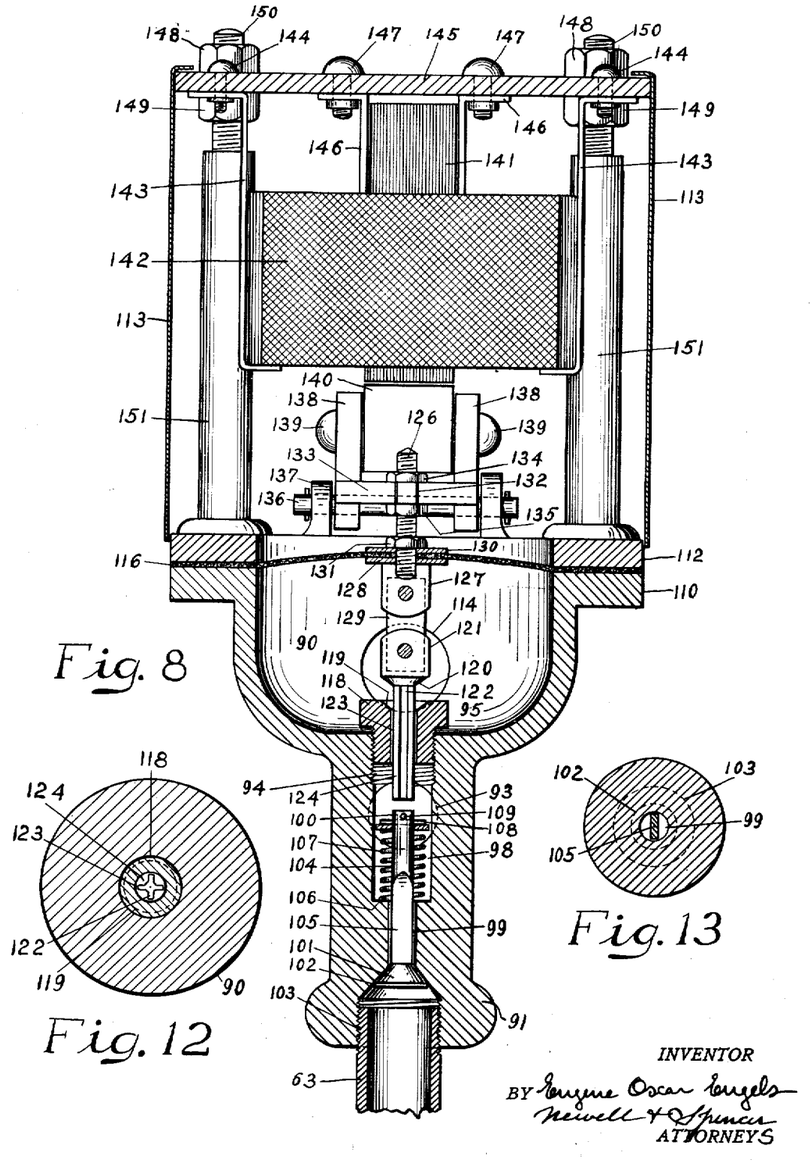
Figure 8 is a vertical sectional view of the modified form shown in Figure 7, the view being taken at right angles to said Figure 7, on the line 8—8 thereof.
Figure 12 is a horizontal sectional view taken on the line 12—12 of Figure 7.
Figure 13 is a horizontal sectional view taken on line 13—13 of Figure 7.
Figure 9:
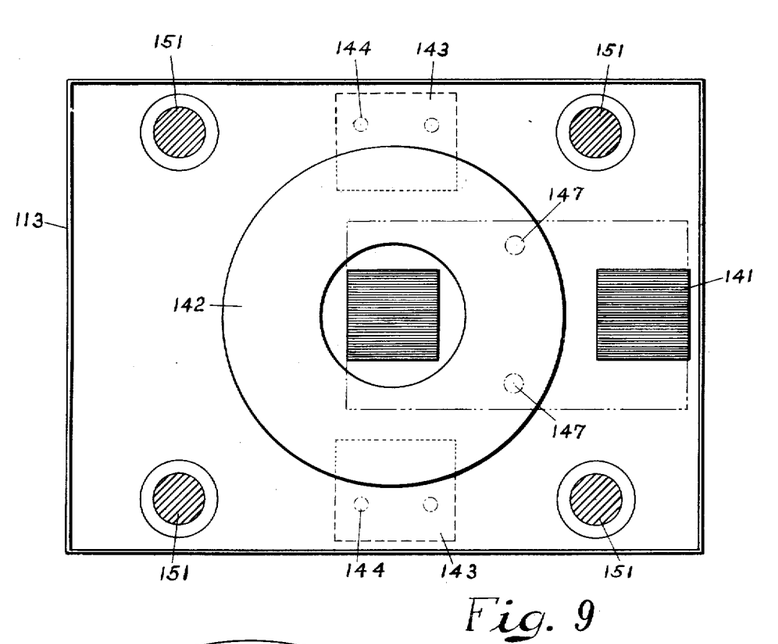
Figure 9 is a horizontal sectional view taken on the line 9—9 of Figure 7.
Figure 10:
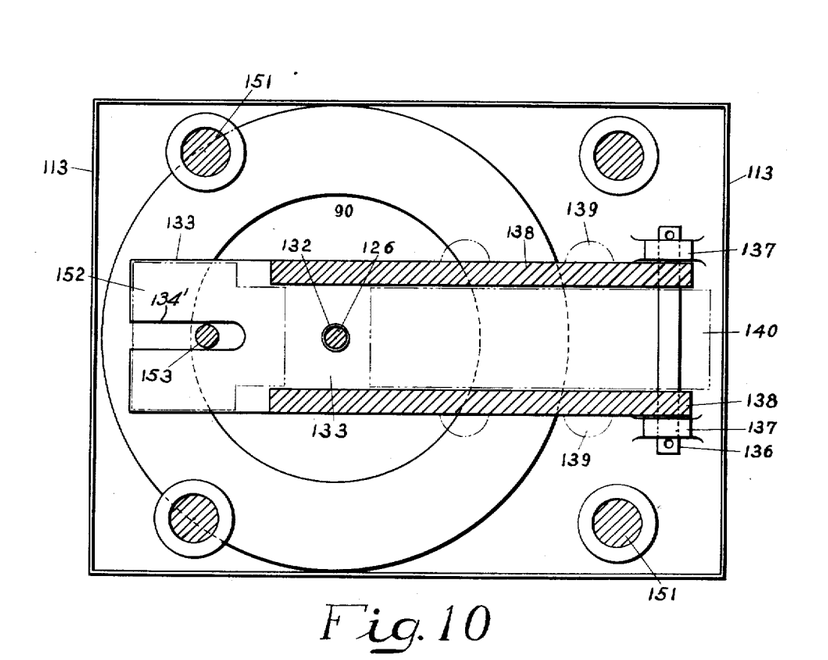
Figure 10 is a horizontal sectional view taken on the line 10—10 of Figure 7.
Figure 11:
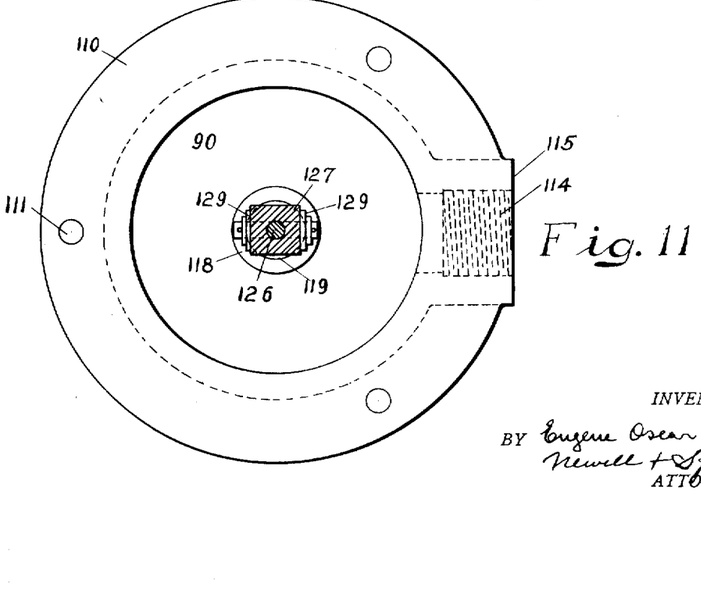
Figure 11 is a horizontal sectional view taken on the line 11—11 of Figure 7.

This extension 91 is provided with a chamber 92, and said chamber is provided in one of its walls with a recess 98 from which leads a passage 99 in such a manner as to provide a shoulder 106. The passage 99 terminates in a valve seat 101 with which a valve member 102 is adapted to engage. This valve member 102 is carried by a stem 100, the upper portion of which occupies a position in the chamber 92 and the recess 98 and is preferably round. The lower portion 105 of stem 100 is reduced, preferably flattened, as shown in Fig. 13, and of such a length, that, when the valve member 102 is in its lowest position, the upper round and thicker part 104 of the stem 100 is not able to enter the passage 99, and the gas can pass freely from pipe 63 through passage 99 to chamber 92. Surrounding this valve stem there is a coiled spring 107, which spring is interposed between the shoulder 106, heretofore mentioned, and a washer 108 carried by the valve stem 100, and prevented from displacement with respect thereto by means of a pin 109. Leading from the chamber 92 at substantially right angles to the passageway 99 there is a passageway 93, in which the nipple 76, heretofore mentioned, is threaded, and leading from the chamber 92 at right angles to the passage 93 in alignment with the passage 99 there is a bore 94.

The valve body 90 is formed with a chamber 95 into which the bore 94 leads, and carried by the valve body 90 there is a plate 112 which is secured to the valve body by means of bolts 111, which bolts pass through a flange 110 formed on the valve body. Interposed between this plate 112 and the valve body 90 there is a diaphragm 116, which diaphragm is secured in position by the plate 112 and its bolts 111. Chamber 95 has communication with the atmosphere through passage 114 in the portion 115 of the side wall thereof.

Mounted in the bore 94 there is a plug 118, and said plug is formed with a valve seat 119 and a passage 123. Mounted in the passage 123 and the plug 118 there is a valve stem 122 carrying a valve 120, and said valve stem is provided preferably with a plurality of longitudinally extending grooves in order that free passage from the chamber 92 into the chamber 95 may be had when the valve 120 is spaced with respect to the valve seat 119, this valve stem being arranged to engage when it descends, the valve stem 100 and move the valve member 102 to open position. The valve stem 122 and the valve 120 are preferably formed integral with a block 121, which block 121 is pivotally mounted by means of a pin 121' between two plates 129. Also mounted between the two plates 129 by means of a pin 129' there is a block 127, which block has a screw-threaded recess adapted to receive one end of a threaded bolt 126. The screw-threaded bolt 126, passes through the diaphragm 116, and arranged on opposite sides of said diaphragm there are two plates 128 and 130 which are caused to clamp the diaphragm therebetween by means of a nut 131.

The upper end of this threaded bolt 126 passes through an opening 132 in a pivoted plate 133, which plate is pivotally mounted between upstanding ears or lugs 137 carried by the plate 112 heretofore mentioned, the pivotal point of said plate being designated 136. This threaded bolt 126 is secured to the pivoted plate 133 by means of nuts 134 and 135 between which said plate is clamped. This pivoted plate 133 has its end bifurcated as at 134', and slidably mounted between the furcations of this bifurcated end there is a bolt 153 which likewise passes through a counterweight 152, and forms together with the nut 154 means for adjustably retaining the counterweight 152 on the bifurcated end of the pivoted plate 133.

Projecting from the plate 112 there are a plurality of hollow internally threaded standards 151, and having engagement with each of said standards there is a threaded bolt 150. The upper end of each of these threaded bolts 150 carries two nuts 148 and 149, and secured between the nuts 148 and 149 there is a plate 145. Supported by this plate there is a housing 113, the lower edge of which encloses the plate 112 as more clearly shown in Figs. 7 and 8. The plate 145 forms the top wall for the housing 113, and secured thereto by bolts or the like 144 there are bracket arms 143, which, as more clearly shown in Fig. 8 serve to support a coil 142 of an electromagnet.

The electromagnet comprises a core 141 of substantially inverted U-shape supported from the top wall 145 of the housing 113 by brackets 146, which in turn are secured to the top wall 145 by bolts or the like 147.

Carried by the pivoted plate 133 there is an armature 140 which is secured to said plate between side flanges 138, and this armature 140 is secured in position by means of transversely extending bolts 139 which pass therethrough and through the side flanges 138.

Figure 7:
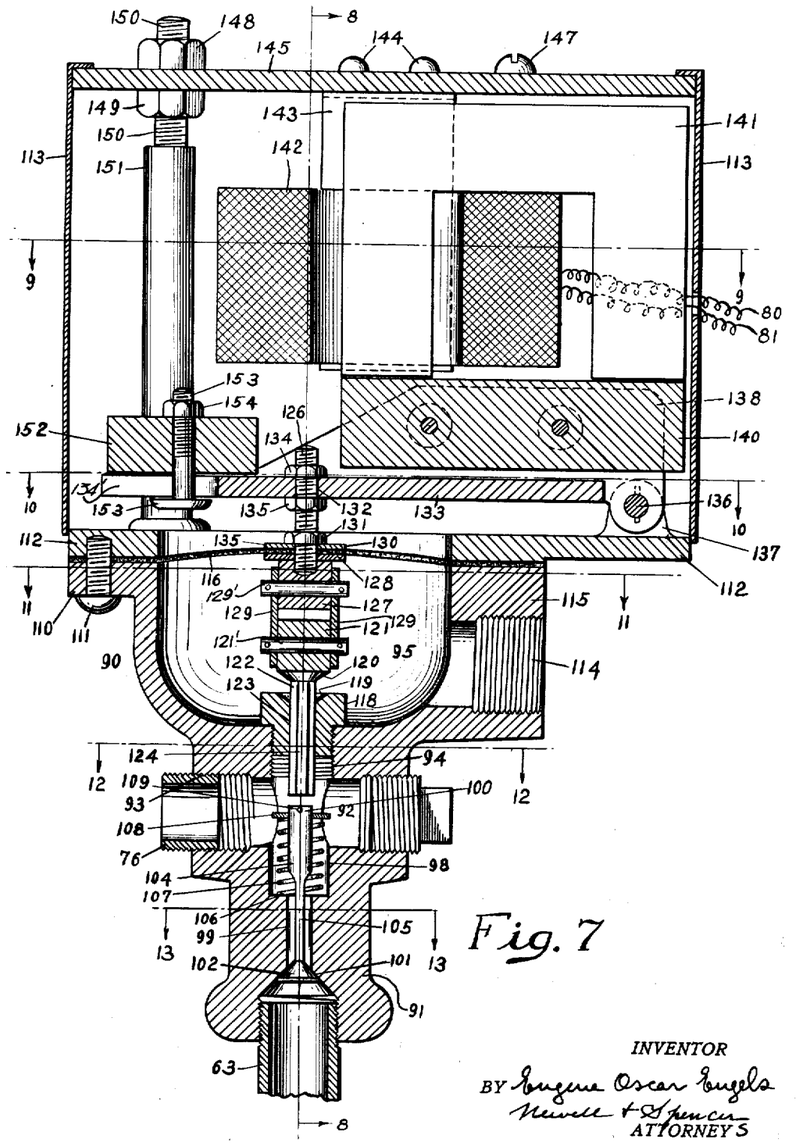
Figure 7 is a vertical sectional view of a mechanism embodying a modified form of the invention.

The coil 142 is connected with the leads 80 and 81 in the same manner as the solenoid 68, heretofore described. The current in the coil 142 energizes the electromagnet and causes it to attract the armature 140, rocking the pivoted plate 133 about its pivotal point 136. This action operates the diaphragm 116 and moves the same to the position in which it is shown in Fig. 7, through the medium of the threaded bolt 126 and its connections with the said diaphragm 116. Upon movement of the diaphragm 116 to the position shown in Figure 7, the valve 120 will be disengaged from the seat 119 and thus establish communication between the dome member 14 and the atmosphere through the pipe section 78, nipple 76, chamber 92, longitudinal grooves 124 in the valve stem 122, chamber 95 and passage 114. With the valve 120 in this position, the free end of the valve stem 122 will be out of engagement with the enlarged end of the valve stem 100, thus permitting the valve member 102 to be held in engagement with its seat 101 under the influence of the coiled spring 107 and the pressure of the gas in the main 5. This position of the valve 102 cuts off communication between the gas main 5 and the chamber 95, and consequently prevents entrance of gas to the dome member 14. This position of the several parts is maintained so long as the electromagnet remains energized by the uninterrupted operation of the electric igniting device.

When, however, the electromagnet becomes deenergized, such, for example, as by failure of operation on the part of the electric igniting device, the armature 138 and counterweighted pivoted plate 133 will fall under the action of gravity and carry the diaphragm 116 downwardly therewith from the position shown in Fig. 7. This action causes the valve 120 to engage the seat 119, and in its movement into engagement with the seat 119 its valve stem 122 will engage the valve stem 100 and move the valve 102 carried thereby out of engagement with its valve seat 101. This operation cuts off the communication of the dome member 14 with the atmosphere by the closing of the valve 120, and establishes communication between the dome member 14 and the gas main 5, through the pipe section 78, nipple 76, chambers 92, recess 98, passageway 99, and pipe section 63. Upon entrance of gas to the dome member 14 through the communication established, as just described, the diaphragm 15 will be depressed by the spring 16 to operate the trigger 13 and release the valve stem 10, permitting the valve 9 to move into engagement with the seat 8 and cut off the supply of fuel to the burners.

From the foregoing it will be apparent that the present invention provides automatically operating means for use in connection with gas burners, which means serves to cut off the supply of gas to the burners upon fall of pressure in the gas main to a point where the burners would be likely to become extinguished, or upon failure of the igniting apparatus, thus preventing an accumulation of free gas in the apparatus heated by the burners.

It is to be understood, however, that the invention is not limited to the particular construction of the illustrated embodiment of the invention, but that the invention may be embodied in other forms within the scope of the claims.

What is claimed as new is—

1. A mechanism for cutting off the supply of gas to gaseous fuel burners provided with igniting devices, said mechanism including a normally open valve permitting free flow of gas to said burners, and means for holding the valve normally in open position and for causing the closing of the valve either upon a fall in the pressure of the gas flowing to the burners below a predetermined point or upon the failure of the igniting devices to function.

2. A mechanism for cutting off the supply of gas to gaseous fuel burners provided with intermittently operated igniting devices, said mechanism including a normally open valve permitting free flow of gas to said burners, and means for holding the valve normally in open position and for causing the closing of the valve either upon a fall in the pressure of the gas flowing to the burners below a predetermined point or upon the failure of the igniting devices to function.

3. A mechanism for cutting off the supply of gas to gaseous fuel burners provided with electric igniting devices, said mechanism including a normally open valve permitting free flow of gas to said burners, and means for holding the valve normally in open position and for causing the closing of the valve upon a fall in the pressure of the gas flowing to the burners below a predetermined point or upon the failure of the igniting devices to function.

4. A mechanism for cutting off the supply of gas to gaseous fuel burners provided with fuel igniting devices, said mechanism including a normally open valve permitting free flow of gas to said burners, and means controlled by the pressure of the gas flowing to the burners for holding the valve normally in open position and for causing the closing of the valve either upon a fall in the pressure of the gas flowing to the burners below a predetermined point or upon the failure of the igniting devices to function.

5. A mechanism for cutting off the supply of fuel to burners, said mechanism including a normally open valve permitting free flow of fuel to the burners, means for holding said valve in its normal open position and permitting the valve to move to closed position when released, and means for controlling the operation of the valve holding means, said controlling means including a diaphragm having one side exposed to the fuel passing through the valve, and subject to the pressure thereof, and its opposite side exposed to atmosphere, means for cutting off communication of the diaphragm with atmosphere and simultaneously establishing communication with the fuel line whereby both sides of the diaphragm are exposed to fuel pressure, and means for moving said diaphragm to release the valve holding means when the opposite sides of the diaphragm are subjected to fuel pressure.

6. A mechanism for cutting off the supply of gas to gaseous fuel burners, said mechanism including a normally open valve permitting free flow of gas to said burners, a latch for holding the valve normally in open position, a pressure actuated diaphragm for retaining said latch in valve holding position, means for causing an equalizing of the pressure on opposite sides of said diaphragm and mechanical means operable upon equalization of pressure on opposite sides of said diaphragm to move the latch to valve releasing position and permit of the valve moving to closed position.

7. A mechanism for cutting off the supply of gas to gaseous fuel burners, said mechanism including a normally open valve permitting free flow of gas to said burners, a latch for holding the valve normally in open position, a diaphragm subjected on one side to the pressure of the gas controlled by said valve and having its opposite side normally open to atmosphere in which condition said diaphragm serves to retain the latch in valve holding position, means for cutting off communication of the one side of said diaphragm with the atmosphere and subjecting it to the action of the gas controlled by the said valve whereby the opposite sides of said diaphragm are subjected to equal pressure, and mechanical means for operating said diaphragm to move said latch to valve releasing position upon equalization of pressure upon opposite sides of said diaphragm.

8. A mechanism for cutting off the supply of gas to gaseous fuel burners of the type employing electric igniting devices, said cut-off means operating upon failure of operation of the electric igniting devices, said mechanism including a valve, a latch for retaining said valve normally in open position, a diaphragm for retaining said latch normally in valve holding position, one side of said diaphragm being subjected to the pressure of the gas controlled by said valve and the opposite side of said diaphragm having communication with atmosphere, electric means operable, upon failure to operate on the part of the electrical igniting device, to cut off the communication of the one side of the diaphragm with atmosphere and subject it to the action of the gas controlled by said valve, and thereby subject the opposite sides of said diaphragm to substantially equal pressure, and a coil spring adapted to move the valve holding latch to valve releasing position upon equalization of pressure upon opposite sides of the diaphragm.

9. In a burner system including a gas burner, an igniting device therefor and a timing device for causing an intermittent spark at the igniting device, means for supplying gas to the burner, a motor for driving said igniter timing device, and means for automatically cutting off the gas supply to the burner upon failure of the motor.

10. In a device of the character described, a normally open valve adapted to move to closed position under the influence of gravity, means for maintaining said valve open against the action of gravity, mechanical means for releasing said valve holding means, and pressure controlled means and electrically controlled means operable independently of each other for controlling the operation of said mechanical valve releasing means.

11. An automatic cut off for gas supply lines comprising, a gravity operated valve adapted to be maintained normally in open position, mechanical means for holding said valve normally open, a diaphragm for operating said valve holding means, said diaphragm being exposed on one side to the pressure of the gas supply line and on the other side normally exposed to atmosphere, electrically operated means for cutting off communication between the diaphragm and the atmosphere, and simultaneously subjecting both sides of said diaphragm to the pressure of the gas supply line, and mechanical means for releasing said valve holding means upon equalization of the pressure upon opposite sides of said diaphragm.

12. In a device of the character described, a valve housing, a secondary housing mounted thereon and forming a continuation of the valve chamber, a weight-operated valve mounted in said valve housing, a diaphragm mounted in the valve chamber, a latch mounted in the valve chamber for holding said valve normally in open position, said latch being retained in valve holding position by said diaphragm, means for closing the open end of said valve chamber, and a coiled spring interposed between the diaphragm and the valve chamber closing means and serving to release the valve holding latch.

13. In a device of the character described, a gas main, and a cut-off valve mounted in the gas main, said cut-off valve comprising a valve housing having an open end, means for closing the open end of the valve housing, a valve mounted in said valve housing, a latch mounted in the housing for holding such valve normally in open position, a diaphragm mounted in the valve chamber and subjected to the pressure of the gas flowing through said main, means connecting the diaphragm with the valve holding latch whereby the latch will be maintained in valve holding position during maintenance of predetermined pressure in the main, and means interposed between the valve chamber closing means and the diaphragm, and connected to said diaphragm for operation thereof to release the valve holding means upon a fall in pressure of the gas passing through said main.

14. In a device of the character described, a gas supply main, and an automatically closing cut-off valve mounted therein for cutting off the flow of gas therethrough, said valve comprising a main housing having a valve seat therein, an auxiliary housing mounted above the main housing, a dome-like member mounted upon said auxiliary housing and serving to close the same, a valve member mounted in the main valve housing and adapted for engagement with the valve seat to cut off the flow of gas through said main, a latch pivotally mounted in the auxiliary housing and having engagement with the valve to maintain the same normally open, a diaphragm subjected to the action of pressure of the gas passing through said main, means connecting the diaphragm with the valve holding latch to retain the same in valve holding position so long as there is a predetermined pressure in the main, and a coiled spring interposed between the diaphragm and the dome-like member for moving the diaphragm to cause the valve retaining latch to release the valve and permit it to move to closed position.

15. A mechanism for cutting off the supply of fuel to gaseous fuel burners comprising a gaseous fuel line, a valve housing in said line, a partition within the housing, extending across said line and having a valve opening, a valve for closing the opening in said partition mounted for sliding movement in the housing, a valve rod upon which the valve is mounted, a latch lever pivoted the valve rod to hold the valve in open position, a diaphragm extending across said ition, a diaphragm extending across said housing and connections between the diaphragm and the latch for controlling the latch.

16. A mechanism for cutting off the supply of gas to burners which burners include electric igniting devices, said mechanism comprising in combination with a gas supplying main, a valve for controlling the passage of gas from the main to the burners, a latch for holding said valve in its open position, and electrically controlled means for releasing the latch and permitting the closing of the valve upon failure of the igniting devices to function.

17. A mechanism for cutting off the supply of gas to burners which burners include electric igniting devices, said mechanism comprising in combination with a gas supplying main, a valve for controlling the passage of gas from the main to the burners, a latch for holding said valve in its open position, and electrically controlled means operated by pressure in the gas main for releasing the latch and permitting the closing of the valve upon failure of the igniting devices to function.

18. A mechanism for automatically cutting off the supply of gas to burners comprising, a valve housing, a valve movable axially of the valve housing, a latch supported from the side wall of the valve housing and serving to hold the valve in open position, a diaphragm extending transversely of the housing and controlled by the pressure therein, means connecting the one side of said diaphragm to said latch whereby the diaphragm normally retains the latch in valve holding position, and a spring operatively connected to said diaphragm and serving to operate the valve holding latch to release the valve upon a fall in pressure in the valve chamber.

19. A mechanism for cutting off the supply of gas to burners comprising in combination with a gas supplying main, a valve for controlling the flow of gas from the main to the burners, a latch for holding said valve in its open position and electrically-controlled means for releasing said valve-holding latch and permitting the valve to move to closed position.

Signed at Saginaw Mich. this 25th day of September 1925.

EUGENE OSCAR ENGELS.

CERTIFICATE OF CORRECTION.

Patent No. 1,686,965.   Granted October 9, 1928, to

EUGENE OSCAR ENGELS.

It is hereby certified that error appears in the printed specification of the above numbered patent requiring correction as follows: Page 7, claim 15, line 102, beginning with the words "the valve" strike out all to and including the word "housing" line 105, and insert instead "within the housing and arranged to act on the valve rod to hold the valve in open position, a diaphragm extending across said housing,"; and that the said Letters Patent should be read with this correction therein that the same may conform to the record of the case in the Patent Office.

Signed and sealed this 11th day of December, A. D. 1928.

(Seal)

M. J. Moore,
Acting Commissioner of Patents.

the valve upon failure of the igniting devices to function.

18. A mechanism for automatically cutting off the supply of gas to burners comprising, a valve housing, a valve movable axially of the valve housing, a latch supported from the side wall of the valve housing and serving to hold the valve in open position, a diaphragm extending transversely of the housing and controlled by the pressure therein, means connecting the one side of said diaphragm to said latch whereby the diaphragm normally retains the latch in valve holding position, and a spring operatively connected to said diaphragm and serving to operate the valve holding latch to release the valve upon a fall in pressure in the valve chamber.

19. A mechanism for cutting off the supply of gas to burners comprising in combination with a gas supplying main, a valve for controlling the flow of gas from the main to the burners, a latch for holding said valve in its open position and electrically-controlled means for releasing said valve-holding latch and permitting the valve to move to closed position.

Signed at Saginaw Mich. this 25th day of September 1925.

EUGENE OSCAR ENGELS.

CERTIFICATE OF CORRECTION.

Patent No. 1,686,965.  Granted October 9, 1928, to

EUGENE OSCAR ENGELS.

It is hereby certified that error appears in the printed specification of the above numbered patent requiring correction as follows: Page 7, claim 15, line 102, beginning with the words "the valve" strike out all to and including the word "housing" line 105, and insert instead "within the housing and arranged to act on the valve rod to hold the valve in open position, a diaphragm extending across said housing,"; and that the said Letters Patent should be read with this correction therein that the same may conform to the record of the case in the Patent Office.

Signed and sealed this 11th day of December, A. D. 1928.

(Seal)

M. J. Moore,
Acting Commissioner of Patents.